US010593050B2

(12) United States Patent
Seo (10) Patent No.: US 10,593,050 B2
(45) Date of Patent: Mar. 17, 2020

(54) APPARATUS AND METHOD FOR DIVIDING OF STATIC SCENE BASED ON STATISTICS OF IMAGES

(71) Applicant: Kyungpook National University Industry-Academic Cooperation Foundation, Daegu (KR)

(72) Inventor: Suyoung Seo, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 76 days.

(21) Appl. No.: 16/060,614

(22) PCT Filed: Dec. 9, 2016

(86) PCT No.: PCT/KR2016/014429
§ 371 (c)(1),
(2) Date: Aug. 2, 2018

(87) PCT Pub. No.: WO2017/099510
PCT Pub. Date: Jun. 15, 2017

(65) Prior Publication Data
US 2018/0374220 A1    Dec. 27, 2018

(30) Foreign Application Priority Data

Dec. 9, 2015   (KR) ..................... 10-2015-0174593

(51) Int. Cl.
*G06T 7/00*   (2017.01)
*G06T 7/246*  (2017.01)
(Continued)

(52) U.S. Cl.
CPC ............... *G06T 7/248* (2017.01); *G06T 5/50* (2013.01); *G06T 7/12* (2017.01); *G06T 7/13* (2017.01);
(Continued)

(58) Field of Classification Search
CPC .......... G06T 7/248; G06T 7/12; G06T 7/143; G06T 7/246; G06T 7/269; G06T 7/13;
(Continued)

(56) References Cited

U.S. PATENT DOCUMENTS 8,494,051 B2 * 7/2013 Li ..................... H04N 19/513
375/240.16
9,715,903 B2 * 7/2017 Gupte ................. G11B 27/3081
(Continued)

FOREIGN PATENT DOCUMENTS

JP    3845407 B2    11/2006
JP    4133060 B2    8/2008
(Continued)

OTHER PUBLICATIONS

Rav-Acha et al: "Two motion-blurred images are better than one", Pattern Recognition Letters, vol. 26, No. 3, Feb. 1, 2005, pp. 311-317.
(Continued)

*Primary Examiner* — Khai M Nguyen
(74) *Attorney, Agent, or Firm* — Carter, DeLuca & Farrell LLP (57) ABSTRACT

The present concept relates to an apparatus for dividing of static scene based on statistics of images that enables more accurate image split processing by correcting movement and brightness components based on statistical information of multiple image frames for a static scene to generate an average image and by splitting the edge area and the non-edge area from the average image, and a method thereof.

15 Claims, 8 Drawing Sheets

(51) Int. Cl.
*G06T 7/12* (2017.01)
*G06T 5/50* (2006.01)
*G06T 7/13* (2017.01)
*G06T 7/174* (2017.01)
*G06T 7/143* (2017.01)
*G06T 7/269* (2017.01)
*H04N 5/232* (2006.01)
*H04N 5/57* (2006.01)

(52) U.S. Cl.
CPC .............. *G06T 7/143* (2017.01); *G06T 7/174* (2017.01); *G06T 7/246* (2017.01); *G06T 7/269* (2017.01); *H04N 5/2327* (2013.01); *H04N 5/57* (2013.01); *G06T 2207/10024* (2013.01); *G06T 2207/20021* (2013.01); *G06T 2207/20076* (2013.01); *G06T 2207/20216* (2013.01)

(58) Field of Classification Search
CPC . G06T 7/174; G06T 5/50; G06T 2207/10024; G06T 2207/20021; G06T 2207/20076; G06T 2207/20216; H04N 5/2327; H04N 5/57
See application file for complete search history.

(56) References Cited

U.S. PATENT DOCUMENTS

| | | |
|---|---|---|
| 2009/0103776 A1 | 4/2009 | Williams et al. |
| 2013/0101208 A1 | 4/2013 | Feris et al. |
| 2014/0111662 A1 | 4/2014 | Mashiah |

FOREIGN PATENT DOCUMENTS

| | | |
|---|---|---|
| KR | 10-2003-0011632 A | 2/2003 |
| KR | 20070040026 A | 4/2007 |
| KR | 10-2012-0071219 A | 7/2012 |
| KR | 10-2012-0090491 A | 8/2012 |
| KR | 10-2013-0047050 A | 5/2013 |
| KR | 20130133371 A | 12/2013 |

OTHER PUBLICATIONS

Extended European Search Report issued in corresponding Application No. 16873375.6 dated Jun. 26, 2019.
IPRP and Written Opinion issued in PCT Application No. PCT/KR2016/014429 dated Mar. 3, 2017.

* cited by examiner

FIG. 5A brightness value surface of
original image brightness value surface of
initial average image

APPARATUS AND METHOD FOR DIVIDING OF STATIC SCENE BASED ON STATISTICS OF IMAGES

CROSS REFERENCE TO RELATED APPLICATIONS

This application is a national phase of PCT Application No. PCT/KR2016/014429 filed on Dec. 9, 2016, which claims the benefit of and priority to Korean Patent Application No. 10-2015-0174593, filed on Dec. 9, 2015, each of which are hereby incorporated by reference herein in their entirety.

TECHNICAL FIELD

The present disclosure relates to an apparatus for dividing of static scene based on statistics of images that enables more accurate image split processing by correcting movement and brightness components based on statistical information of multiple image frames for a static scene to generate an average image and by splitting the average image into edge area and non-edge area, and a method thereof.

BACKGROUND ART

An image is composed of three signals of R, G, and B, and image split extracts the same color area or the same object area in the image composed of input color signals. Such image extraction data may be useful in fields related to digital image processing such as image analysis and image recognition for object based image information processing.

Most image area split methods based on color signals usually project input color signals to different types of color spaces and extract their density or split them using space adjacency of each color pixel in the image area.

More specifically, the image split method includes edge detection split, threshold based split, area based split, and split method using movement. In particular, area growth techniques detect a seed point serving as a reference of the area through an area-based image split method and split areas through a method of determining whether neighboring pixels may be included in the same area as the seed point according to the relationship between the seed point and the neighboring pixels.

However, a major concern with image split is over split of the area. Over split means that the image is split too much into the unintended area, and it is necessary to set appropriate criteria for area growth and merging to prevent such over split. At this time, consideration should also be given to the size of the split area.

Splitting an image through the area growth technique may be comparatively superior in performance and may be implemented simply. However, it is difficult to set a precise split criterion for progressive changes in intensity of light, such as shadows in real photographs, and it is much affected by noise.

In particular, the conventional area growth technique using a single frame is vulnerable to noise. In order to reduce the noise, a method of applying a smoothing operation is used. However, this has the effect of reducing noise in a single image, while sharp shapes are wasted, resulting in deterioration of image split performance.

DISCLOSURE OF THE INVENTION

Technical Problem

The present disclosure is to provide an apparatus for dividing of static scene based on statistics of images that performs more accurate and efficient split processing for a static scene by obtaining a plurality of image frames for one static scene and by splitting the static scene into the edge and non-edge areas based on the average image generated by correcting movement and brightness components through the average and variance values for each image frame, and a method thereof.

Technical Solution

Embodiments of the present invention provide an apparatus for dividing of static scene based on statistics of images for splitting an area for one static scene by using a plurality of image frames for the static scene provided from a camera, the apparatus including a static scene split device, wherein the static scene split device includes: a movement correction module configured to set one image frame among a plurality of image frames provided from the camera as a reference image and compare the reference image with each of the remaining image frames to generate each resampling image according to a movement difference, a brightness correction module configured to set as an initial average image an image generated using an average value for each pixel for a plurality of resampling image frames that are movement-corrected through the movement correction module and the reference image, regenerate an average image based on a variation value by a brightness difference of an average image and each image frame to update the average image, and repeatedly perform an average image update process based on the variation value until a difference between a current average image variation value and a previous average image variation value becomes equal to or less than a predetermined reference value, and an image split module configured to split an edge area and a non-edge area using a final average image in which the variation value update amount of the average image generated by the brightness correction module is equal to or less than the predetermined reference value.

In an embodiment, the movement correction module may include: a corner point detection block configured to detect a corner point for each image frame provided from the camera; a displacement calculation block configured to calculate a corner point displacement between the reference image and each image frame based on the corner point detected in the corner point detection block, and an image resampling block configured to generate a resampling image for the corresponding image frame using the corner point displacement calculated in the displacement calculation block.

In an embodiment, in the displacement calculation block, an initial image frame may be set as the reference image.

In an embodiment, the brightness correction module may include: an initial average image generation block configured to generate an initial average image using an average value for each pixel of the plurality of movement-corrected image frames and sets the initial average image as the current average image, a brightness value estimation block configured to estimate a brightness value difference for each pixel for the current average image and the plurality of image frames provided from the camera, a variation value estimation block configured to estimate a variation value for each image frame based on a predetermined average image on the basis of a brightness value difference for each image frame estimated in the brightness value estimation block, an average image generation block configured to generate an average image using the average variation value of each image frame to update the average image to the current average image, and an average image setting block configured to calculate an image variation value of the current average image, set to re-perform average image generation processing based on the average variation value if a difference between the image variation value of the current average image and a variation value of the previous average image exceeds the predetermined reference value, and set the current average image as the final average image if the difference between the image variation value of the current average image and the variation value of the previous average image is equal to or less than the predetermined reference value.

In an embodiment, the image split module may include: a gradient image generation block configured to convert the final average image generated in the brightness correction module into a gradient image based on a difference with neighboring pixel value for each pixel of the final average image, and an image split block configured to calculate a gradient magnitude for each pixel in the gradient image, and compare the calculated pixel size to a predetermined threshold value to split the average image into an edge area and a non-edge area.

In an embodiment, the threshold value may be set to a predetermined ratio of a variation value for the average image generated in the brightness correction module.

In an embodiment, in the image split block, an area having a gradient magnitude equal to or larger than the threshold value may be set as an edge area, and an area having the gradient magnitude less than the threshold value may be set as a non-edge area.

In an embodiment, the gradient magnitude for each pixel may be calculated by the following equation. $G=\sqrt{(G_x)^2+(G_y)^2}$ where GX is a left and right neighboring pixel difference value, and GY is an upper and lower neighboring pixel difference value.

In other embodiments of the present invention, a method for dividing of static scene based on statistics of images includes: a movement correction process for setting an image frame of one of a plurality of image frames for one static scene provided from a camera as a reference image and comparing the reference image with the rest of the image frame to generate respective resampling images according to a movement difference, a brightness correction process for setting an initial average image as a current average image using average values for each pixel of the plurality of resampling images generated in the movement correction process and reference image, updating the current average image by regenerating an average image based on a variation value by a brightness difference of the current average image and each image frame, and repeating the average image update process based on the variation value until a variation value difference between the current average image and a previous average image becomes equal to or less than the reference value, and an image split step of splitting an edge area and a non-edge area using a final average image generated in the brightness correction process.

In an embodiment, the movement correction process may include: a corner point detection step for detecting a corner point for each image frame provided from the camera; a displacement calculating step for calculating a corner point displacement between the reference image and each image frame based on the corner point detected in the corner point detecting step, and an image resampling step for generating a resampling image for the corresponding image frame using the corner point displacement calculated in the displacement calculating step.

In an embodiment, in the movement correction process, a first image frame may be set as the reference image for the static scene.

In an embodiment, the brightness correction process may include: an initial average image generation step for generating an initial average image using an average value for each pixel of the plurality of movement-corrected image frames in the movement correction process and setting the initial average image as the current average image, a brightness value estimation step for estimating a brightness value difference for each pixel for the current average image and the plurality of image frames provided from the camera, a variation value estimation step for estimating a variation value for each image frame based on a predetermined average image on the basis of a brightness value difference for each image frame estimated in the brightness value estimation step, an average image generation step for generating an average image using the average variation value of each image frame to update the average image to the current average image, and an average image setting step for calculating the image variation value of the current average image, re-performing average image generation processing based on the average variation value if a difference between the image variation value of the current average image and a variation value of the previous average image exceeds the predetermined reference value, and setting the current average image as the final average image if the difference between the image variation value of the current average image and the variation value of the previous average image is equal to or less than the predetermined reference value.

In an embodiment, the image split step may include: a gradient image generation step for converting the final average image generated in the brightness correction process into a gradient image based on a difference with neighboring pixel value for each pixel of the final average image, and an image split step for calculating a gradient magnitude for each pixel in the gradient image, comparing the calculated pixel size to a predetermined threshold value to split the average image into an edge area and a non-edge area.

In an embodiment, the threshold value may be set to a predetermined ratio of a variation value for the average image generated in the brightness correction process.

In an embodiment, in the image split step, an area having a gradient magnitude equal to or larger than the threshold value may be set as an edge area, and an area having the gradient magnitude less than the threshold value may be set as a non-edge area.

Advantageous Effects

According to the inventive concept, it is possible to more accurately and efficiently split the static scene by dividing the edge area and the non-edge area by using the average image which is improved in clarity of the sharp shape while remarkably reducing the noise component of the image.

Or, since the noise component is reduced and the sharp shape is clarified, it is possible to extract accurate information on the shapes of the objects existing in the image, so that the field used for performing the processing using the image, for example, cultural assets, art works, a robot or 3D mapping, 3D printing, and the like may be dramatically improved.

MODE FOR CARRYING OUT THE INVENTION

Hereinafter, the inventive concept is described in more detail with reference to the accompanying drawings. It should be noted that like elements in the drawings are denoted by the same reference numerals whenever possible. Specific structural or functional explanations for embodiments according to the inventive concept which are disclosed in this specification or application are merely provided for the purpose of illustrating the embodiments according to the inventive concept. Thus, the embodiments according to the inventive concept may be implemented in various forms and are not construed as being limited to the embodiments described in this specification or application. Therefore, the embodiments described in the present specification and the configurations shown in the drawings are only the most preferred embodiments of the inventive concept, and do not represent all of the technical ideas of the inventive concept. It should be understood that various equivalents and modifications may be substituted for those at the time of filing of the present application.

Figure 1:
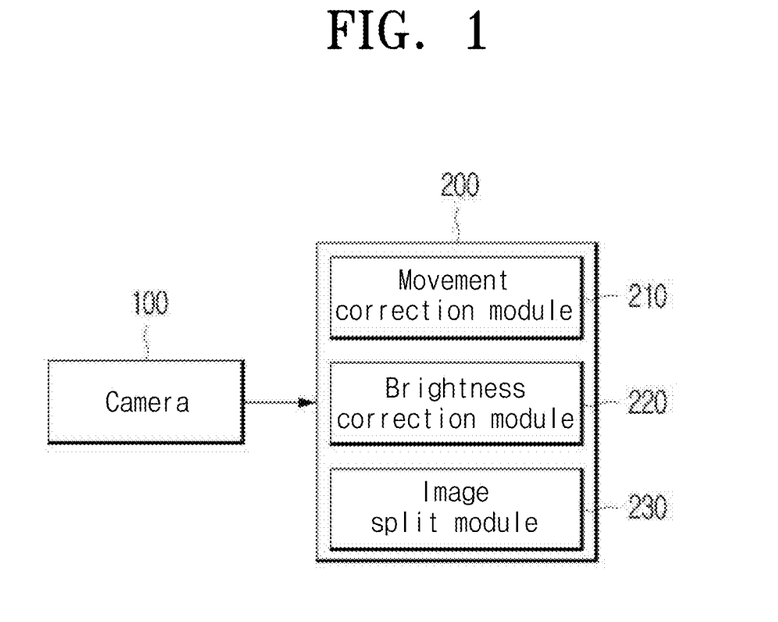
FIG. 1 is a schematic diagram illustrating an image statistical information based a static scene split device based on image statistical information according to a first embodiment of the inventive concept.

FIG. 1 is a schematic diagram illustrating an image statistical information based static scene split device according to a first embodiment of the inventive concept.

As shown in FIG. 1, an image statistical information based static scene split device according to an inventive concept includes a camera 100 and a static scene split device 200.

The camera 100 captures one static scene under the same conditions a plurality of times and provides a plurality of image frames for one static scene to the static scene split device 200.

The static scene split device 200 is configured to calculate statistical information of a plurality of shot images provided from the camera 100, that is, an original image frame, and also obtain the average image in which movement and brightness components are corrected using this, and split the edge area and the non-edge area using this average image.

At this time, the static scene split device 200 includes a movement correction module 210, a brightness correction module 220, and an image split module 230.

In FIG. 1, the movement correction module 210 corrects a movement generated for a plurality of image frames provided from the camera 100. For example, various movement noises that may be generated due to a movement of the camera 100 through external factors such as shaking of the camera 100 itself during a photographing operation, wind, and the like are corrected.

Figure 2:
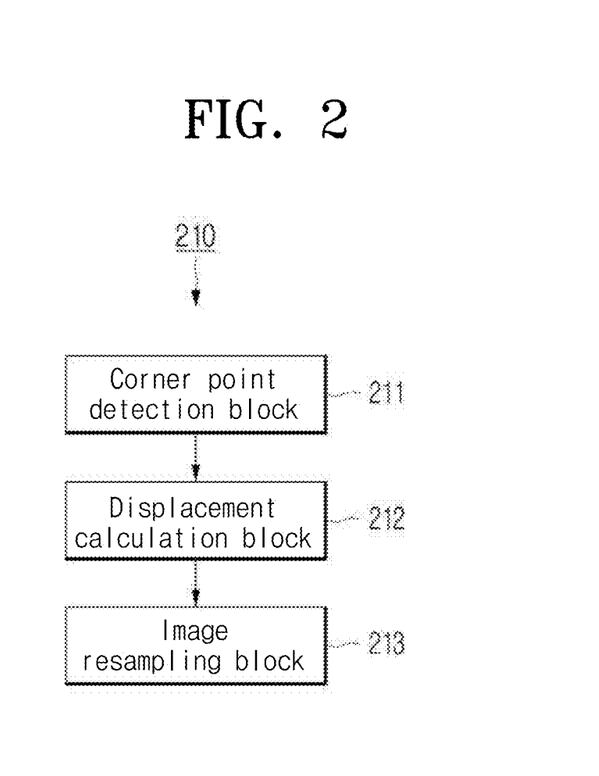
FIG. 2 is a functional block diagram illustrating an internal configuration of the movement correction module 210 shown in FIG. 1.

The movement correction module 210 includes a corner point detection block 211, a displacement calculation block 212 and an image resampling block 213 as shown in FIG. 2.

Figure 3A:
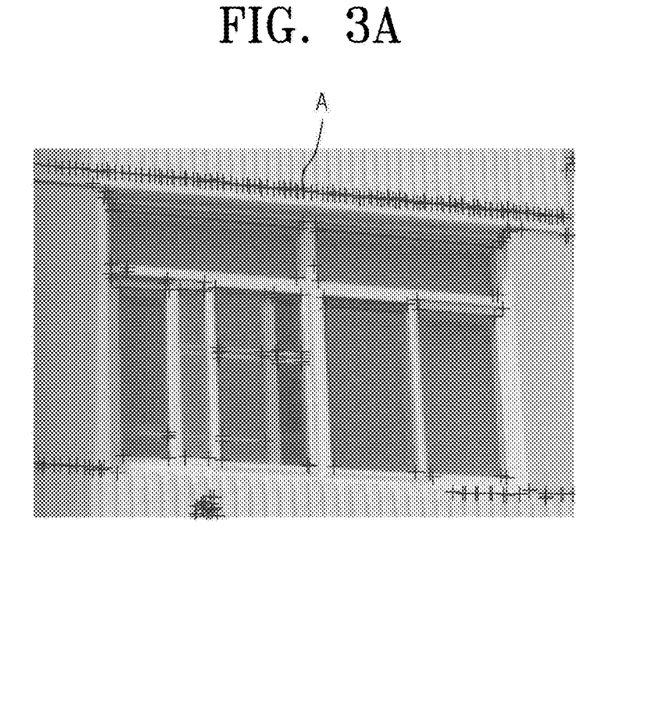
FIGS. 3A-3C are diagrams illustrating image processing results from the movement correction module 210 shown in FIG. 2.

The corner point detection block 211 detects a corner point for each image frame provided from the camera 100 using a Harris operator. FIG. 3A is a diagram illustrating a result of detection of a corner point A. For example, corner points for each of the 30 image frames are detected.

Figure 3B:
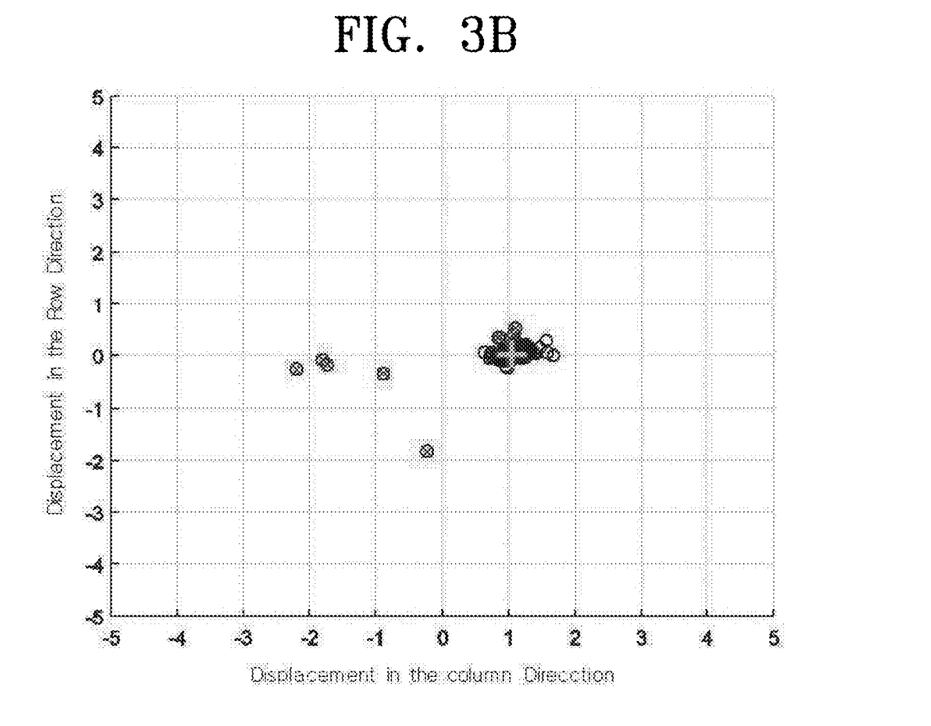

The displacement calculation block 212 calculates the displacement between the reference image and the original image frame based on the corner point detected by the corner point detection block 211 using a Least squares matching technique. At this time, the reference image is set as the initial image frame. In other words, if the first to 30th image frames are present according to the photographing order, by setting the first image frame as the reference image, it calculates a corner point displacement between the first image frame and the second image frame, a corner point displacement between the first image frame and the third image frame, . . . a corner point displacement between the first image frame and the 30th image frame. FIG. 3B is a diagram illustrating a corner point displacement calculated by least squares matching between the first image frame and the 30th image frame for the static scene shown in FIG. 3A.

Figure 3C:
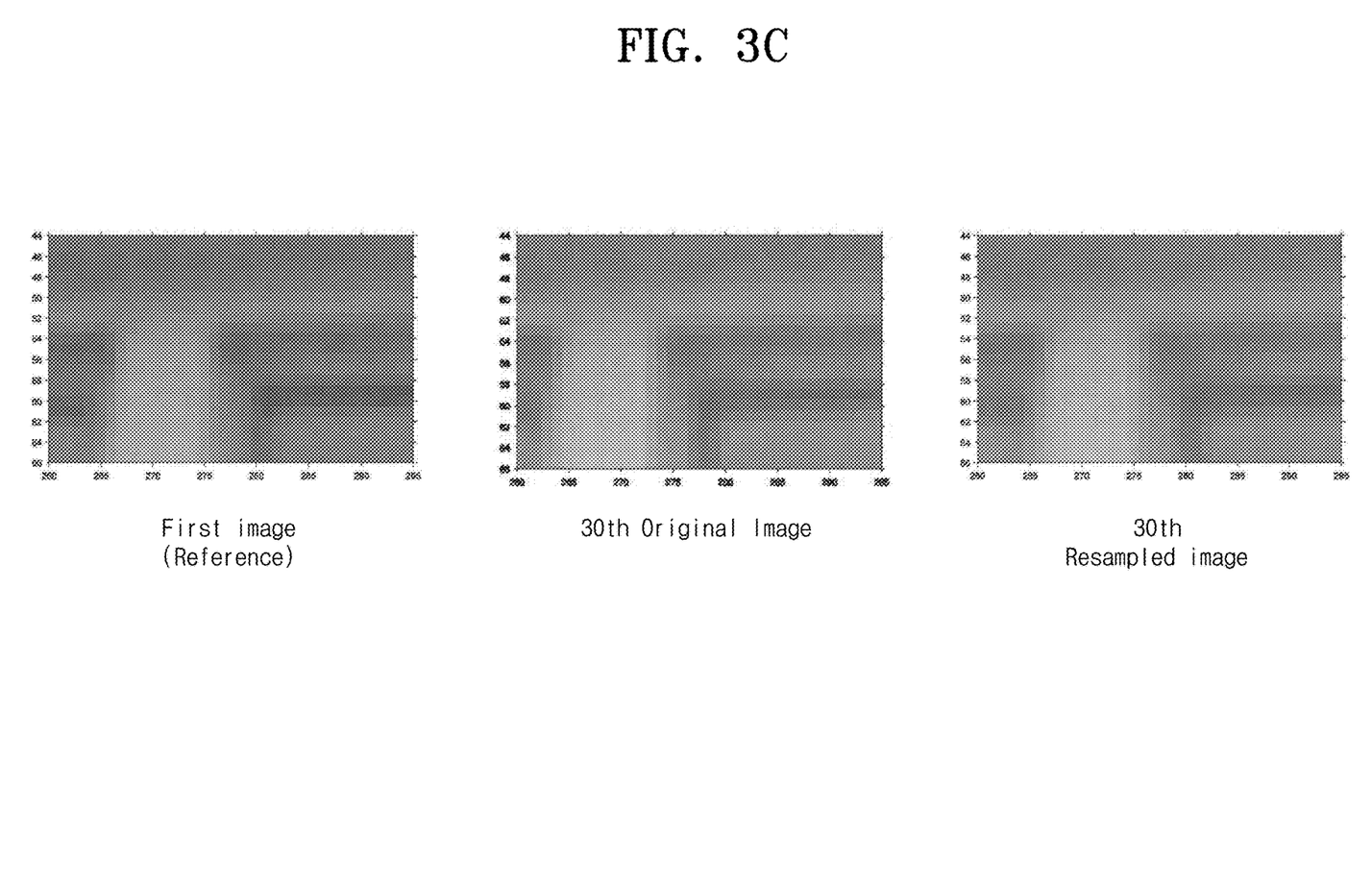

The image resampling block 213 generates a resampling image for the original image frame on the basis of the displacement calculated in the displacement calculation block 212. That is, a resampling image for the 30th image frame is generated based on the corner point displacement between the first image frame and the 30th image frame. FIG. 3C is a diagram illustrating a resampled image for the 30th image frame based on the displacement shown in FIG. 3B. That is, as shown in FIG. 3C, it is confirmed that the 30th resampled image frame (30th resampled image) is well positioned and matched to the first image, which is the reference image, compared to the 30th image frame (30th original image).

Meanwhile, in FIG. 1, the brightness correction module 200 performs a systematic correction for a minute brightness change occurring between a series of image frames. At this time, the brightness correction module 200 performs brightness correction based on an average and a variance value at each pixel position of an image frame.

Figure 4:
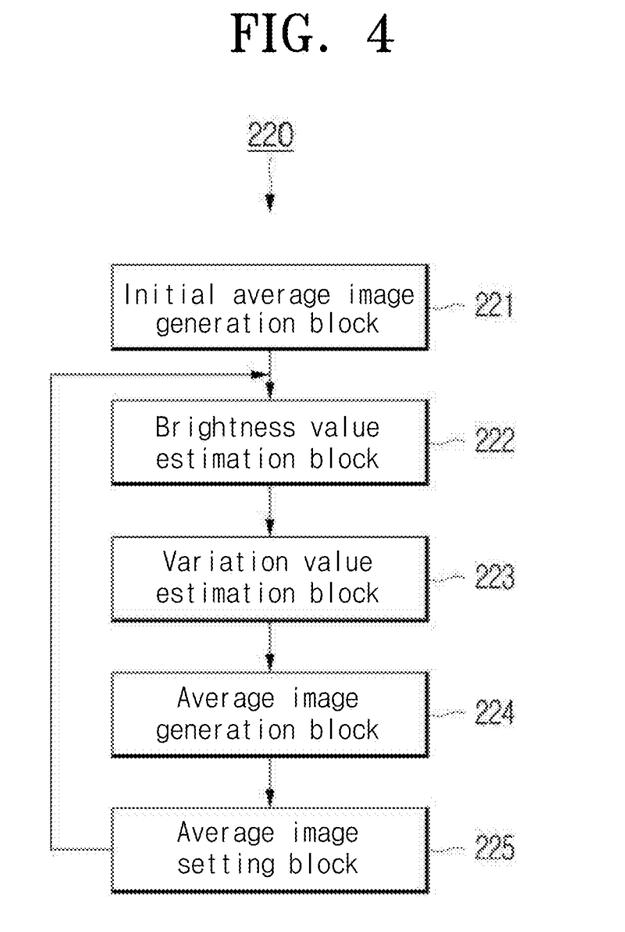
FIG. 4 is a functional block diagram of an internal configuration of the brightness correction module 220 shown in FIG. 1.

As shown in FIG. 4, the brightness correction module 220 includes an initial average image generation block 221, a brightness value estimation block 222, a variation value estimation block 223, an average image generation block 224, and an average image setting block 225.

Figure 5A:
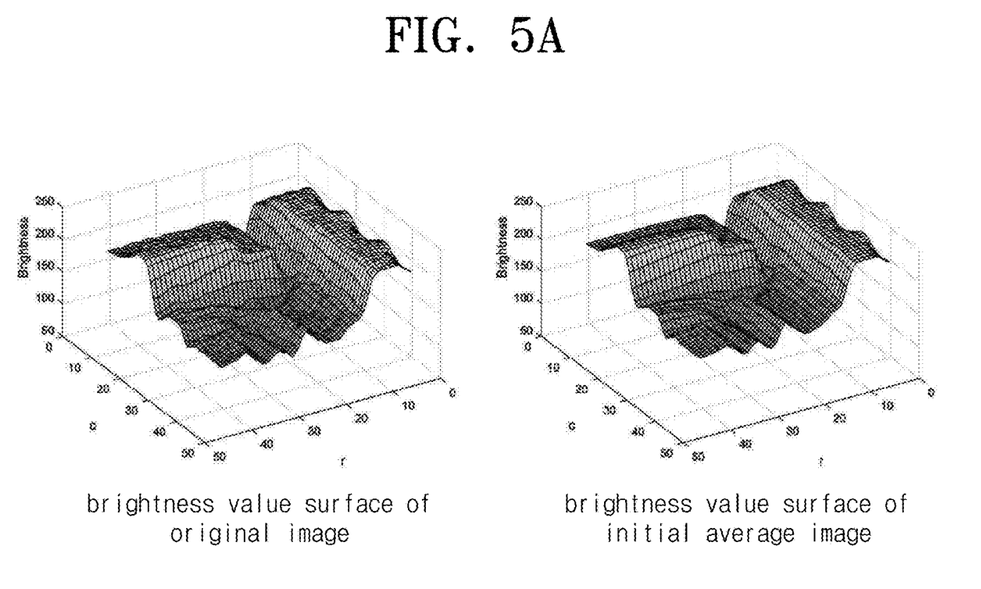
FIGS. 5A-5C are diagrams illustrating image processing results from the brightness correction module 220 shown in FIG. 4.

The initial average image generation block 221 calculates a brightness average value of each pixel of the resampling images and the reference image generated by the movement correction module 210 to generate a base initial average image and set it as a current average image. For example, the average value image generation block 221 calculates brightness average values for each pixel in the first image frame and the second to 30th resampling images for the second to 30th image frames, respectively, and generates an initial average image having a brightness average value for each pixel. FIG. 5A is a diagram illustrating a comparison between a brightness value surface of an original image and a brightness value surface of an initial average image for a certain pixel. In FIG. 5A, it may be checked that the initial average image is significantly reduced in noise and sharp shapes are more clear than the original image.

Figure 5B:
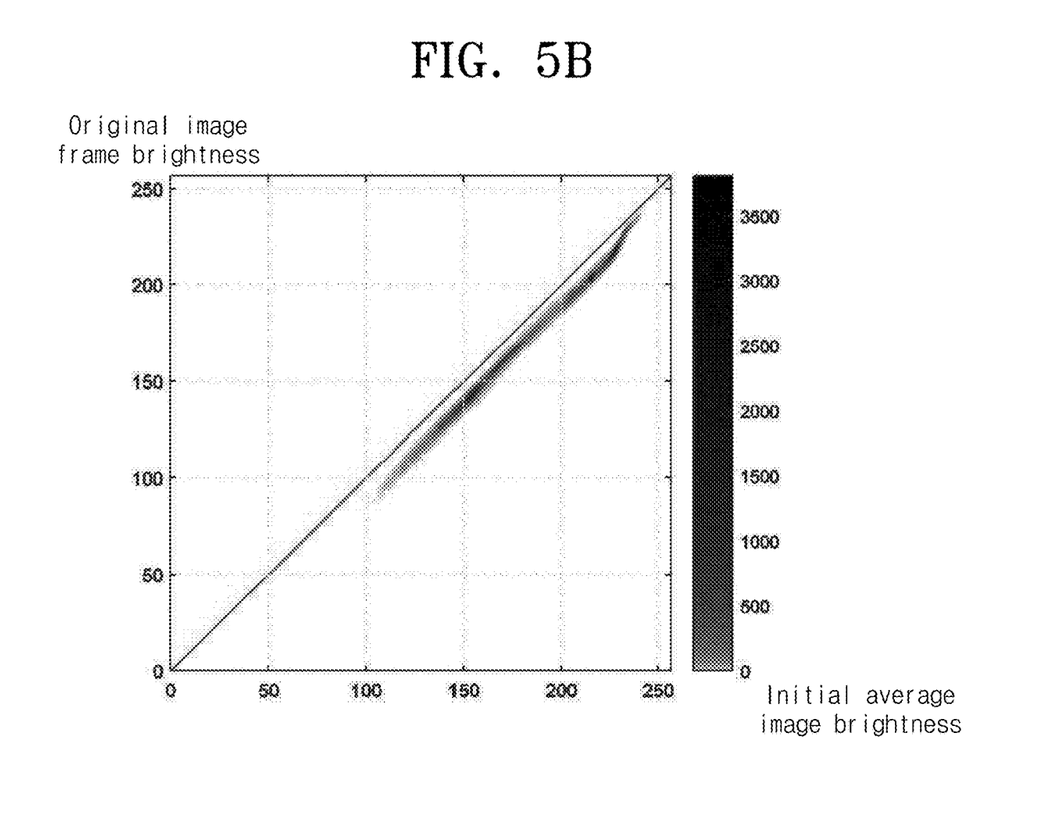

The brightness value estimation block 222 estimates a brightness value difference between a current average image and an original image provided from the camera 100, that is, a plurality of image frames. The brightness value estimation block 222 initially estimates the brightness value difference between the initial average image generated by the initial average image generation block 221 and the original image frame, and then estimates the brightness value difference between the current average image and the original image frame, which are reset according to the variation value condition. FIG. 5B is a diagram illustrating a brightness value relationship between an average image and a specific original image frame. In FIG. 5B, it may be seen that the overall brightness value has a certain amount of difference between the average image and the original image frame. That is, the brightness value estimation block 222 estimates a brightness value difference between the initial average image and the first through thirtieth image frames, respectively.

The variation value estimation block 223 estimates a variation value for a corresponding image frame based on a predetermined current average image on the basis of a brightness value difference for each original image frame estimated by the brightness value estimation block 222. That is, the variation value estimation block 223 initially estimates a variation value for an image frame based on an initial average image, and then estimates a variation value for an image frame based on an average image generated according to a previous variation value condition.

The average image generation block 224 generates an average image using the variation value estimated by the variation value estimation block 223, and updates the average image to the current average image. That is, the average image generation block 224 calculates a variation average value for variation values of each pixel of each image frame, and generates an average image based on the variation average value. That is, the average image generation block 224 calculates a variation average value for variation values of each pixel of each image frame, and generates an average image based on the variation average value.

Figure 5C:
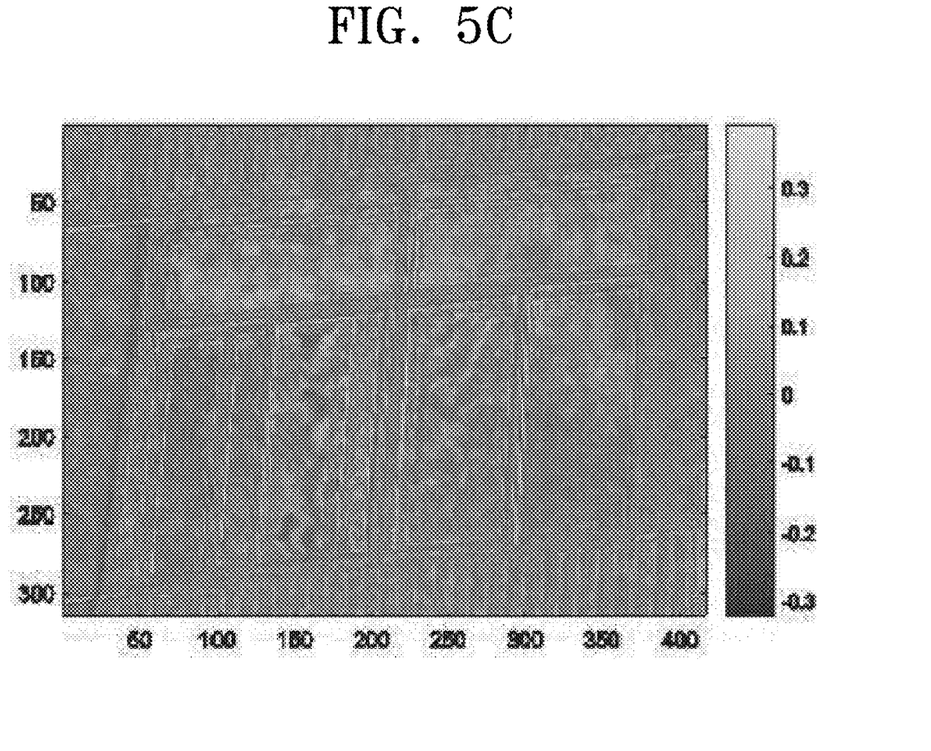
Figure 6:
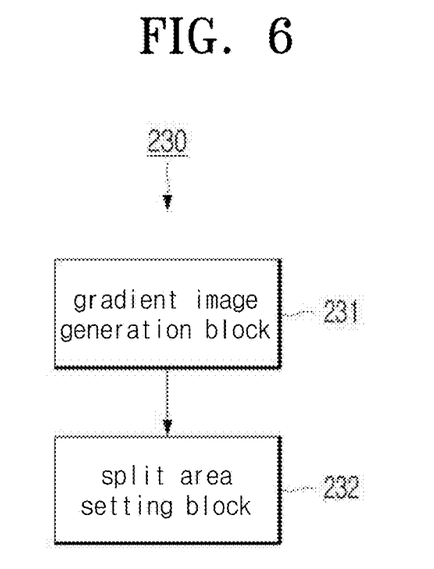
FIG. 6 is a functional block diagram of an internal configuration of the image split module 230 shown in FIG. 1.

The average image setting block 225 calculates an image variation value of the average image generated in the average image generating block 224, and if the difference between the image variation value of the current average image and the variation value of the average image generated in the previous iteration is equal to or less than the preset reference value, set the currently generated average image to the final average image. That is, FIG. 5C is a diagram illustrating a change in the average image according to the repeated estimation update. As the variation value becomes smaller, the average image becomes clearer.

Meanwhile, in FIG. 1, the image split module 230 separates and splits the edge area and the non-edge area from the average image determined as the final average image in the brightness correction module 220. At this time, the image split module 230 includes a gradient image generation block 231 and a split area setting block 232.

Figure 7:
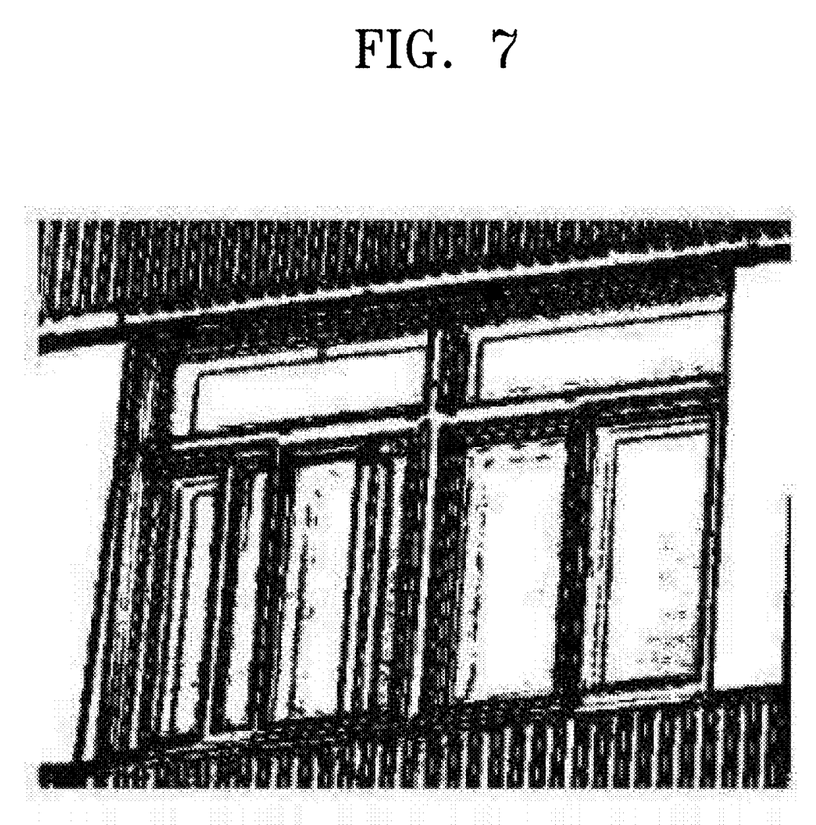
FIG. 7 is a diagram illustrating a gradient image generated by the image split module 230 shown in FIG. 6.

The gradation image generation block 231 converts the average image determined as the final average image in the brightness correction module 220 into a gradient image. Here, the gradient image conversion process is an image generated based on the difference between neighboring pixel values of each pixel in the image, preferably, four neighboring pixel values in the up, down, left, and right directions. FIG. 7 is a diagram illustrating a gradient conversion image.

The split area setting block 232 calculates a gradient magnitude for each pixel in the gradient image generated in the gradient image block 231, and compares the calculated pixel size with a threshold value to split the corresponding average image into an edge area and a non-edge area. At this time, the threshold value may be set to a predetermined ratio of the variation value to the average image generated in the brightness correction module, for example, "10 times" the average image variation value. In addition, the split area setting block 232 calculates a gradient magnitude for each pixel by using a difference value between each pixel and surrounding pixel values, and four neighboring pixel values on the left, right, upper, and lower sides. For example, the split area setting block 232 may calculate the gradient magnitude G for each pixel through the following Equation 1.

$$G = \sqrt{(G_x)^2 + (G_y)^2} \qquad \text{[Equation 1]}$$

Here, GX is the left and right neighboring pixel difference value, and GY is the upper and lower neighboring pixel difference value.

That is, the split area setting block 232 sets an area having a gradient magnitude equal to or greater than a preset threshold value as an edge area, and sets an area having a gradient magnitude less than a predetermined threshold value as a non-edge area.

Meanwhile, the process of calculating the average image variation value in the brightness correction module 200 may be mathematically modeled through Equations 2 to 8.

First, the brightness value difference between image frames is estimated through Equations 2 and 3. At this time, Equation 2 and Equation 3 are mathematical modeling of a case where the overall brightness value has a certain amount of difference.

$$\begin{aligned} I_{F_1} &= I_\mu^j + b_{F_1}^j + e_{F_1}^j \\ I_{F_2} &= I_\mu^j + b_{F_2}^j + e_{F_2}^j \\ &\vdots \\ I_{F_f} &= I_\mu^j + b_{F_f}^j + e_{F_f}^j \end{aligned} \qquad \text{[Equation 2]}$$

$$I_{F_i} - I_\mu^j = \begin{bmatrix} 1 \\ 1 \\ \vdots \\ 1 \end{bmatrix} b_{F_i}^j + e_{F_i}^j \qquad \text{[Equation 3]}$$

Here, Equation 3 is a summary of Equation 2. In Equations 1 and 2, j is the number of repetitions, $I_\mu^j$ is the average image brightness value in the current iteration, $I_{F_i}$ is the brightness value (i=1, . . . f, f: frame index) of each image frame, $e_{F_i}^j$ is a noise amount, $b_{F_i}^j$ is a brightness difference value.

Moreover, in Equation 3, the brightness value difference and the noise amount may be expressed by Equation 4.

$$y_{F_i}^j = \tau b_{F_i}^j + e_{F_i}^j, \quad e_{F_i}^j \sim N\left(0, \sum\nolimits_{F_i}^j = (\sigma_{F_i}^j)^2 I\right) \quad \text{[Equation 4]}$$

$$\hat{b}_{F_i}^j = (\tau^T \tau)^{-1} \tau^T y_{F_i}^j$$

$$\tilde{e}_{F_i}^j = y_{F_i}^j - \tau \hat{b}_{F_i}^j$$

$$(\hat{\sigma}_{F_i}^j)^2 = \frac{\tilde{e}_{F_i}^{j\,T} \tilde{e}_{F_i}^j}{R \cdot C - 1}$$

Here, $y_{F_i}^j$ is a vector identity for the row number R and the column number C of an image when $\tau=[1, \ldots i]$ in Equation 3.

Moreover, in Equation 4, the brightness value of the corresponding image frame at the pixel position r,c of an image is modeled as shown in Equation 5.

$$I_{F_1}(r, c) - \hat{b}_{F_1}^j = I_\mu^{j+1}(r, c) + e_{F_1}^j(r, c) \quad \text{[Equation 5]}$$

$$I_{F_2}(r, c) - \hat{b}_{F_2}^j = I_\mu^{j+1}(r, c) + e_{F_2}^j(r, c)$$

$$\vdots$$

$$I_{F_f}(r, c) - \hat{b}_{F_f}^j = I_\mu^{j+1}(r, c) + e_{F_f}^j(r, c)$$

In addition, when Equation 5 is expressed as a vector identity for N image frames, it is identical to Equation 6.

$$y_P^j(r,c) = \tau I_\mu^{j+1}(r,c) + e_P^j(r,c) \quad \text{[Equation 6]}$$

Here, $\tau=[1, \ldots 1]$ and the number of images is "1×N".

In Equation 6, a noise vector ($e_P^j)(r,c)$) has a variation component matrix. This noise vector ($e_P^j(r,c)$) estimation equation is Equation 7.

$$e_P^j(r, c) = \begin{bmatrix} e_{F_1}^j(r, c) \\ e_{F_2}^j(r, c) \\ \vdots \\ e_{F_f}^j(r, c) \end{bmatrix} \sim \quad \text{[Equation 7]}$$

$$N\left(0, \sum\nolimits_P^j = \begin{bmatrix} (\hat{\sigma}_{F_1}^j)^2 & & & \\ & (\hat{\sigma}_{F_2}^j)^2 & & \\ & & \ddots & \\ & & & (\hat{\sigma}_{F_f}^j)^2 \end{bmatrix}\right)$$

Thus, the brightness value of a new average image is modeled as in Equation 8.

$$\hat{I}_\mu^{j+1}(r,c) = (\tau^T (\Sigma_P^j)^{-1} \tau)^{-1} \tau^T (\Sigma_P^j)^{-1} y_P^j(r,c) \quad \text{[Equation 8]}$$

In addition, the variation value (xxx) of the new average image estimated by Equation 8 is modeled as shown in Equation (9).

$$D\{\hat{I}_\mu^{j+1}(r,c)\} = (\tau^T (\Sigma_P^j)^{-1} \tau)^{-1} \quad \text{[Equation 9]}$$

That is, the brightness correction module 200 calculates the variation value of the new average image using the mathematical expression obtained through the mathematical modeling, and compares the difference value between the variation value of the new average image and the reference value of the previous average image with a predetermined reference value to set the final average image.

Figure 8:
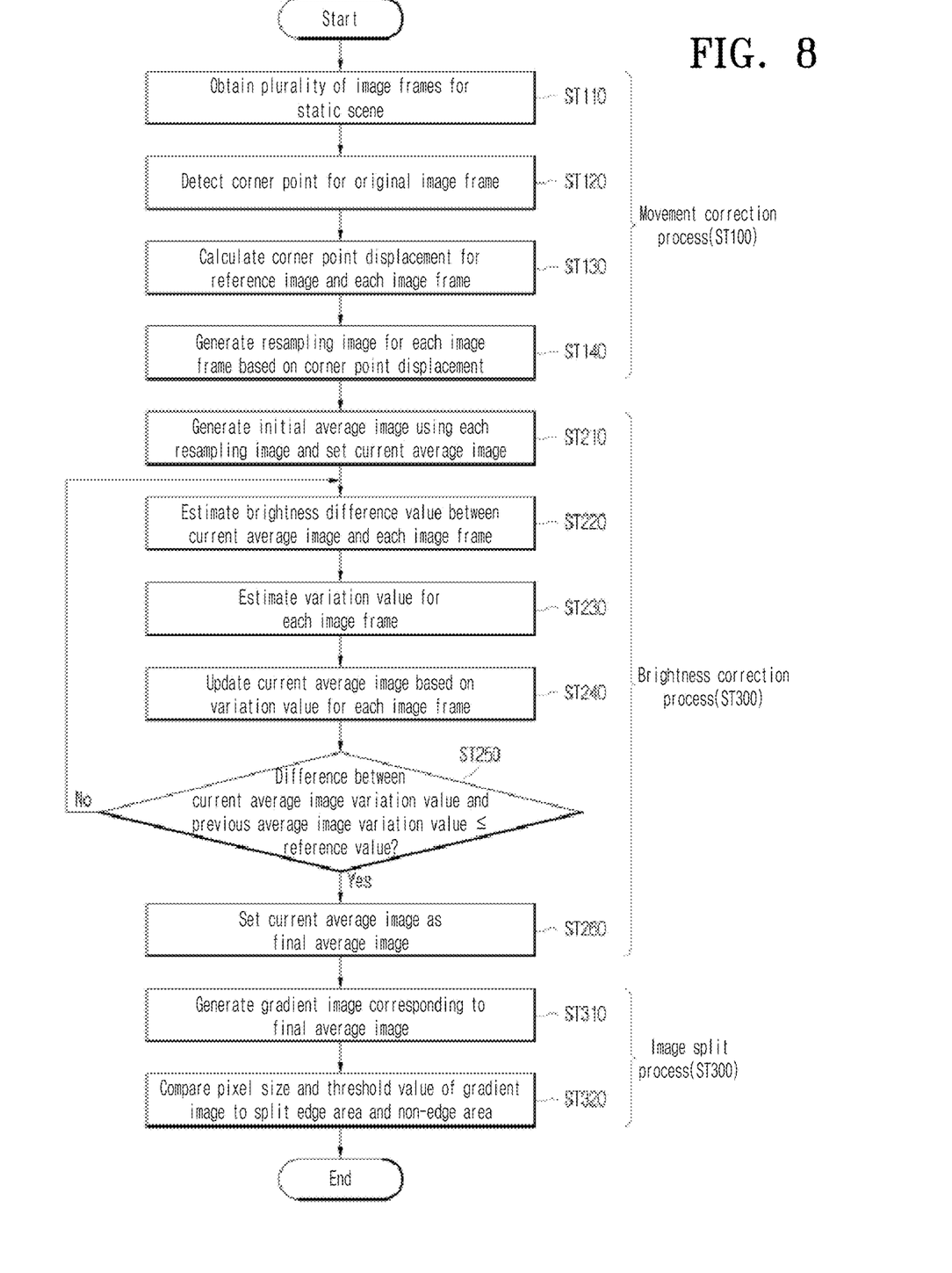
FIG. 8 is a flowchart illustrating a static scene split method based on image statistical information according to the first embodiment of the inventive concept.

Next, an image statistical information based static scene split method according to the first embodiment will be described with reference to the flowchart shown in FIG. 8.

First, based on the inventive concept, an image statistical information based static scene split method is largely divided into a movement correction step ST100 for correcting shift noises generated between a plurality of image frames provided from the camera 100, a brightness correction step ST200 for systematically correcting a minute brightness change occurring between a series of image frames by generating an average image based on a brightness variation value between image frames and by updating the average image by applying the weighted brightness variation value to the previous average image and generating the final average image satisfying the condition with the preset reference value, and an image split step ST300

First, the movement correction step ST100 includes a step ST110 for acquiring a plurality of image frames for one static scene provided from the camera 100, a step ST120 for detecting a corner point using the Harris operator for the plurality of image frames obtained, a step ST130 of calculating a corner point displacement between comparison images, that is, an image other than the reference image based on the detected corner point through a Least squares matching technique, and a step ST140 for generating a resampling image for each image frame based on the corner point displacement.

Then, the brightness correction step ST200 includes a step ST210 for generating an initial average image using the resampling image generated in the movement correction step ST100 and setting the initial average image as a current average image, a step ST220 for estimating a brightness difference value of each pixel between the current average image and each image frame, a step ST230 for estimating a variation value for each image frame based on the current average image using the brightness difference value per pixel, a step ST240 for generating an average image using a variation value for each image frame and updating the current average image, a step ST250 for determining whether the difference between the variation value of the average image set to the current average image and the variation value of the average image generated in the previous iteration is equal to or less than a predetermined reference value, and if the difference between the variation value of the current average image and the variation value of the previous average image is equal to or less than the reference value, a step ST260 for setting the current average image as the final average image. At this time, if the variation value of the current average image exceeds the reference variation value in the step ST250, the steps ST220 to ST250 described above are repeatedly performed.

Then, in the image split step ST300, a step ST310 for converting the final average image set in the brightness correction step ST200 into a gradient image and a step ST320 for calculating a gradient magnitude for each pixel in the gradient image, comparing the calculated pixel size and threshold value, and splitting the average image into an edge area and a non-edge area based on the result are performed.

That is, according to the embodiment, it is configured to obtain multiple image frames for one static scene, generate an initial average image through movement correction for multiple image frames, perform the brightness correction between multiple image frames based on the initial average image, and perform the brightness correction for the weighted average image until the difference between the variation value of the new average image and the variation value of the previous average image is equal to or less than a preset reference value to produce a final average image.

Therefore, edge area and non-edge area are split by using the final average image with minimized noise component, thereby enabling more accurate and efficient static scene split processing.

The invention claimed is:

1. An apparatus for dividing of static scene based on statistics of images for splitting an area for one static scene by using a plurality of image frames for the static scene provided from a camera, the apparatus comprising a static scene split device, wherein the static scene split device comprises:
a movement correction module configured to set one image frame among a plurality of image frames provided from the camera as a reference image and compare the reference image with each of the remaining image frames to generate each resampling image according to a movement difference;
a brightness correction module configured to set as an initial average image an image generated using an average value for each pixel for a plurality of resampling image frames that are movement-corrected by the movement correction module and the reference image, regenerate an average image based on a variation value by a brightness difference of an average image and each image frame to update the average image, and repeatedly perform an average image update process based on the variation value until a difference between a current average image variation value and a previous average image variation value becomes equal to or less than a predetermined reference value; and
an image split module configured to split an edge area and a non-edge area using a final average image in which the variation value update amount of the average image generated by the brightness correction module is equal to or less than the predetermined reference value.

2. The apparatus of claim 1, wherein the movement correction module comprises:
a corner point detection block configured to detect a corner point for each image frame provided from the camera;
a displacement calculation block configured to calculate a corner point displacement between the reference image and each image frame based on the corner point detected in the corner point detection block; and
an image resampling block configured to generate a resampling image for the corresponding image frame using the corner point displacement calculated in the displacement calculation block.

3. The apparatus of claim 2, wherein in the displacement calculation block, an initial image frame is set as the reference image.

4. The apparatus of claim 1, wherein the brightness correction module comprises:
an initial average image generation block configured to generate an initial average image using an average value for each pixel of the plurality of movement-corrected image frames and set the initial average image as the current average image;
a brightness value estimation block configured to estimate a brightness value difference for each pixel for the current average image and the plurality of image frames provided from the camera;
a variation value estimation block configured to estimate a variation value for each image frame based on a predetermined average image on the basis of a brightness value difference for each image frame estimated in the brightness value estimation block;
an average image generation block configured to generate an average image using the average variation value of each image frame to update the average image to the current average image; and
an average image setting block configured to calculate an image variation value of the current average image, set to re-perform average image generation processing based on the average variation value if a difference between the image variation value of the current average image and a variation value of the previous average image exceeds the predetermined reference value, and set the current average image as the final average image if the difference between the image variation value of the current average image and the variation value of the previous average image is equal to or less than the predetermined reference value.

5. The apparatus of claim 1, wherein the image split module comprises:
a gradient image generation block configured to convert the final average image generated in the brightness correction module into a gradient image based on a difference with neighboring pixel value for each pixel of the final average image; and
an image split block configured to calculate a gradient magnitude for each pixel in the gradient image, and compare the calculated pixel size to a predetermined threshold value to split the average image into an edge area and a non-edge area.

6. The apparatus of claim 5, wherein the threshold value is set to a predetermined ratio of a variation value for the average image generated in the brightness correction module.

7. The apparatus of claim 5, wherein in the image split block, an area having a gradient magnitude equal to or larger than the threshold value is set as an edge area, and an area having the gradient magnitude less than the threshold value is set as a non-edge area.

8. The apparatus of claim 5, wherein the gradient magnitude for each pixel is calculated by the following equation, $G=\sqrt{(G_x)^2+(G_y)^2}$ where Gx is a left and right neighboring pixel difference value, and Gy is an upper and lower neighboring pixel difference value.

9. A method for dividing of static scene based on statistics of images, the method comprising:
setting an image frame of one of a plurality of image frames for one static scene provided from a camera as a reference image;
comparing the reference image with the rest of the image frame to generate respective resampling images according to a movement difference;
setting an initial average image as a current average image using average values for each pixel of the generated resampling images and reference image;
updating the current average image by regenerating an average image based on a variation value by a brightness difference of the current average image and each image frame;
repeating update of the average image based on the variation value until a variation value difference between the current average image and a previous average image becomes equal to or less than a predetermined reference value; and
splitting an edge area and a non-edge area using a final average image.

10. The method of claim 9, wherein setting the image frame comprises:
   detecting a corner point for each image frame provided from the camera;
   calculating a corner point displacement between the reference image and each image frame based on the corner point detected in the detecting; and
   generating a resampling image for the corresponding image frame using the corner point displacement calculated in the calculating.

11. The method of claim 9, wherein in the setting of the image frame, a first image frame is set as the reference image for the static scene.

12. The method of claim 9, wherein setting the initial average image comprises:
   generating an initial average image using an average value for each pixel of the plurality of movement-corrected image frames and setting the initial average image as the current average image;
   estimating a brightness value difference for each pixel for the current average image and the plurality of image frames provided from the camera;
   estimating a variation value for each image frame based on a predetermined average image on the basis of a brightness value difference for each image frame estimated;
   generating an average image using an average variation value of each image frame to update the average image to the current average image; and
   calculating the image variation value of the current average image, re-performing average image generation processing based on the average variation value if a difference between the image variation value of the current average image and the previous average image exceeds the predetermined reference value, and setting the current average image as the final average image if the difference between the image variation value of the current average image and the variation value of the previous average image is equal to or less than the predetermined reference value.

13. The method of claim 9, wherein splitting the edge area comprises:
   converting the final average image generated in the setting into a gradient image based on a difference with neighboring pixel value for each pixel of the final average image;
   calculating a gradient magnitude for each pixel in the gradient image; and
   comparing the calculated pixel size to a predetermined threshold value to split the average image into an edge area and a non-edge area.

14. The method of claim 13, wherein the threshold value is set to a predetermined ratio of a variation value for the average image generated in the brightness correction process.

15. The method of claim 13, wherein in the calculating, an area having a gradient magnitude equal to or larger than the threshold value is set as an edge area, and an area having the gradient magnitude less than the threshold value is set as a non-edge area.

* * * * *